United States Patent
Korenaga

(10) Patent No.: US 11,808,477 B2
(45) Date of Patent: Nov. 7, 2023

(54) OUTDOOR UNIT OF AIR-CONDITIONING APPARATUS

(71) Applicant: Mitsubishi Electric Corporation, Tokyo (JP)

(72) Inventor: Kazunori Korenaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/778,043

(22) PCT Filed: Feb. 6, 2020

(86) PCT No.: PCT/JP2020/004524
§ 371 (c)(1),
(2) Date: May 19, 2022

(87) PCT Pub. No.: WO2021/157002
PCT Pub. Date: Aug. 12, 2021

(65) Prior Publication Data
US 2022/0412598 A1    Dec. 29, 2022

(51) Int. Cl.
*F24F 11/83* (2018.01)
*F24F 1/38* (2011.01)

(52) U.S. Cl.
CPC ............... *F24F 11/83* (2018.01); *F24F 1/38* (2013.01)

(58) Field of Classification Search
CPC ........ F25B 2600/111; F25B 2700/1931; F24F 2140/12; F24F 11/38; F24F 11/83
See application file for complete search history.

(56) References Cited

U.S. PATENT DOCUMENTS

2016/0129756 A1* 5/2016 Enomoto ............ B60H 1/32284
                                                      62/244
2019/0011157 A1* 1/2019 Ohura ..................... F25B 13/00

FOREIGN PATENT DOCUMENTS

JP    H05-50847 A    3/1993
JP    2009-133557 A  6/2009
(Continued)

OTHER PUBLICATIONS

International Search Report of the International Searching Authority dated Mar. 10, 2020 for the corresponding International application No. PCT/JP2020/004524 (and English translation).
(Continued)

*Primary Examiner* — Schyler S Sanks
(74) *Attorney, Agent, or Firm* — POSZ LAW GROUP, PLC

(57) ABSTRACT

An outdoor unit of an air-conditioning apparatus is provided with an outdoor heat exchanger configured to cause refrigerant that flows in the outdoor heat exchanger and air to exchange heat with each other, a plurality of outdoor fans each configured to rotate by driving of a motor and send air to the outdoor heat exchanger, and a controller configured to control the driving of the motor. When operation of one of the plurality of outdoor fans is stopped, the controller is configured to control the motor such that a rotation frequency of each of the plurality of outdoor fans that is in operation after operation of the one of the plurality of outdoor fans is stopped is higher than a rotation frequency of each of the plurality of outdoor fans that is in operation before operation of the one of the plurality of outdoor fans is stopped.

4 Claims, 5 Drawing Sheets

(56) References Cited

FOREIGN PATENT DOCUMENTS

| | | |
|---|---|---|
| JP | 2013-076544 A | 4/2013 |
| WO | 2015/045452 A1 | 4/2015 |
| WO | WO-2015045452 A1 * | 4/2015 ................ F24F 1/14 |

OTHER PUBLICATIONS

Office Action dated May 30, 2023 issued in corresponding JP patent application No. 2021-575181 (and English translation).

* cited by examiner

FIG. 4

| OPERATION LEVEL | ROTATION FREQUENCY | | | | NUMBER OF OUTDOOR FANS IN OPERATION |
|---|---|---|---|---|---|
| | OUTDOOR FAN 1 | OUTDOOR FAN 2 | ... OUTDOOR FAN n-1 | OUTDOOR FAN n | |
| 1 | 200 | STOPPED | STOPPED | STOPPED | 1 |
| 2 | 400 | STOPPED | STOPPED | STOPPED | 1 |
| 3 | 150 | 150 | STOPPED | STOPPED | 2 |
| ⋮ | ⋮ | ⋮ | ⋮ | ⋮ | ⋮ |
| a | 250 | 250 | 250 | STOPPED | n-1 |
| b | 150 | 150 | 150 | 150 | n |
| ⋮ | ⋮ | ⋮ | ⋮ | ⋮ | ⋮ |
| N | 300 | 300 | 300 | 300 | n |

OUTDOOR UNIT OF AIR-CONDITIONING APPARATUS

CROSS REFERENCE TO RELATED APPLICATION

This application is a U.S. national stage application of International Patent Application No. PCT/JP2020/004524 filed on Feb. 6, 2020, the disclosure of which is incorporated herein by reference.

TECHNICAL FIELD

The present disclosure relates to an outdoor unit of an air-conditioning apparatus that is provided with a plurality of outdoor fans.

BACKGROUND

Some outdoor unit has been known that is provided with a large outdoor heat exchanger and a plurality of outdoor fans and has improved heat-exchange capability. In a case in which outdoor air is low in temperature, a load is low, and cooling operation is performed, such an outdoor unit reduces a rotation frequency of a motor that drives each of the plurality of outdoor fans and thus reduces its heat-exchange capability. The outdoor unit thus increases a pressure at a high-pressure side of a compressor and ensures a difference between a high pressure and a low pressure. Furthermore, in a case in which the motor reaches its minimum possible rotation frequency, when the pressure at the high-pressure side of the compressor is further increased, the outdoor unit stops operation of some of the outdoor fans to reduce heat-exchange capability of the entirety of the outdoor heat exchanger and increase the pressure at the high-pressure side of the compressor.

Patent Literature 1 discloses an outdoor unit configured to exercise control such that a total amount of air that passes through each of the outdoor fans is set to one of amounts of air that are prefixed stepwise as selectable options. When operation of some of the outdoor fans is stopped, in the outdoor unit disclosed in Patent Literature 1, an amount of air that passes through one of the outdoor fans that is kept in operation is set higher than the one of the prefixed amounts of air. Patent Literature 1 describes that, even in a case in which air flows back to any of the outdoor fans whose operation is stopped, such a configuration is to ensure an amount of air that passes through the outdoor heat exchanger and prevent excessive reduction in heat-exchange capability of the outdoor heat exchanger.

Patent Literature

Patent Literature 1: Japanese Unexamined Patent Application Publication No. 2013-76544

In the outdoor unit disclosed in Patent Literature 1, however, an amount of air that passes through one of the outdoor fans that is kept in operation is merely set higher than the one of the prefixed amounts of air by an amount of air that flows backward. Much air does not usually pass through part of the outdoor heat exchanger that faces an outdoor fan that is stopped and heat is thus hardly exchanged. That is, when some of the outdoor fans is stopped, the heat-exchange capability of the outdoor heat exchanger is reduced not only by reduction in amount of air that passes through the outdoor heat exchanger but also by reduction in heat-transfer area.

In the outdoor unit disclosed in Patent Literature 1, an amount of air that passes through one of the outdoor fans that is kept in operation is set higher than the one of the prefixed amounts of air by an amount of air that flows backward. In the outdoor unit disclosed in Patent Literature 1, when some of the outdoor fans is stopped, the heat-exchange capability of the outdoor heat exchanger thus may be suddenly reduced. The outdoor unit disclosed in Patent Literature 1 is therefore not capable of retaining a stable refrigeration cycle.

SUMMARY

The present disclosure is made to solve such a problem and to provide an outdoor unit of an air-conditioning apparatus that retains a stable refrigeration cycle.

Solution to Problem

An outdoor unit of an air-conditioning apparatus according to an embodiment of the present disclosure is provided with an outdoor heat exchanger configured to cause refrigerant that flows in the outdoor heat exchanger and air to exchange heat with each other, a plurality of outdoor fans each configured to rotate by driving of a motor and send air to the outdoor heat exchanger, and a controller configured to control the driving of the motor. When operation of one of the plurality of outdoor fans is stopped, the controller is configured to control the motor such that a rotation frequency of each of the plurality of outdoor fans that is in operation after operation of the one of the plurality of outdoor fans is stopped is higher than a rotation frequency of each of the plurality of outdoor fans that is in operation before operation of the one of the plurality of outdoor fans is stopped.

According to an embodiment of the present disclosure, when operation of one of the outdoor fans is stopped, the controller is configured to control the motor such that a rotation frequency of each of the outdoor fans that is in operation after operation of the one of the outdoor fans is stopped is higher than a rotation frequency of each of the outdoor fans that is in operation before operation of the one of the outdoor fans is stopped. When operation of one of the outdoor fans is stopped, the heat-exchange capability of the outdoor heat exchanger is thus gradually reduced. The outdoor unit is therefore capable of retaining a stable refrigeration cycle.

BRIEF DESCRIPTION OF DRAWINGS

FIG. 4 is a table that illustrates operation levels and rotation frequencies of outdoor fans 25 according to Embodiment 1.

DETAILED DESCRIPTION

Embodiment 1

Embodiments of an outdoor unit 2 according to Embodiment 1 are described below with reference to drawings. FIG.

Figure 1:
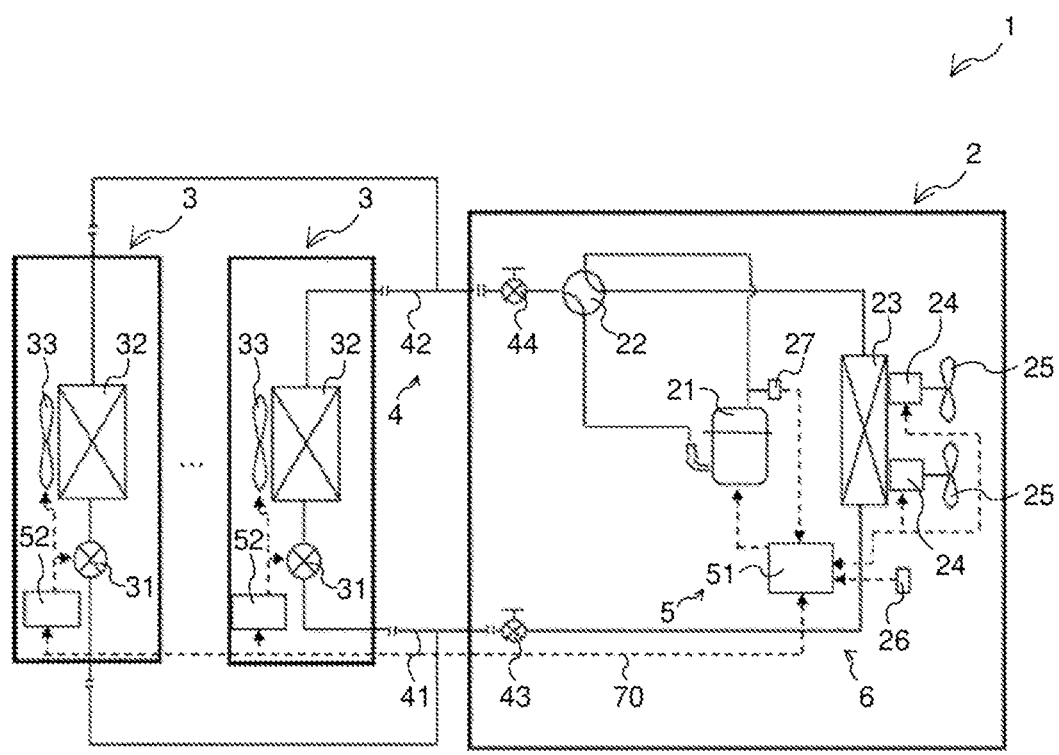
FIG. 1 is a circuit diagram that illustrates an air-conditioning apparatus 1 according to Embodiment 1.

1 is a circuit diagram that illustrates an air-conditioning apparatus 1 according to Embodiment 1. As illustrated in FIG. 1, the air-conditioning apparatus 1 has the outdoor unit 2, indoor units 3, a refrigerant pipe 4, and a controller 5. FIG. 1 illustrates two indoor units 3 as an example. Alternatively, the number of the indoor units 3 may be one or three or more.

Outdoor Unit 2

Figure 2:
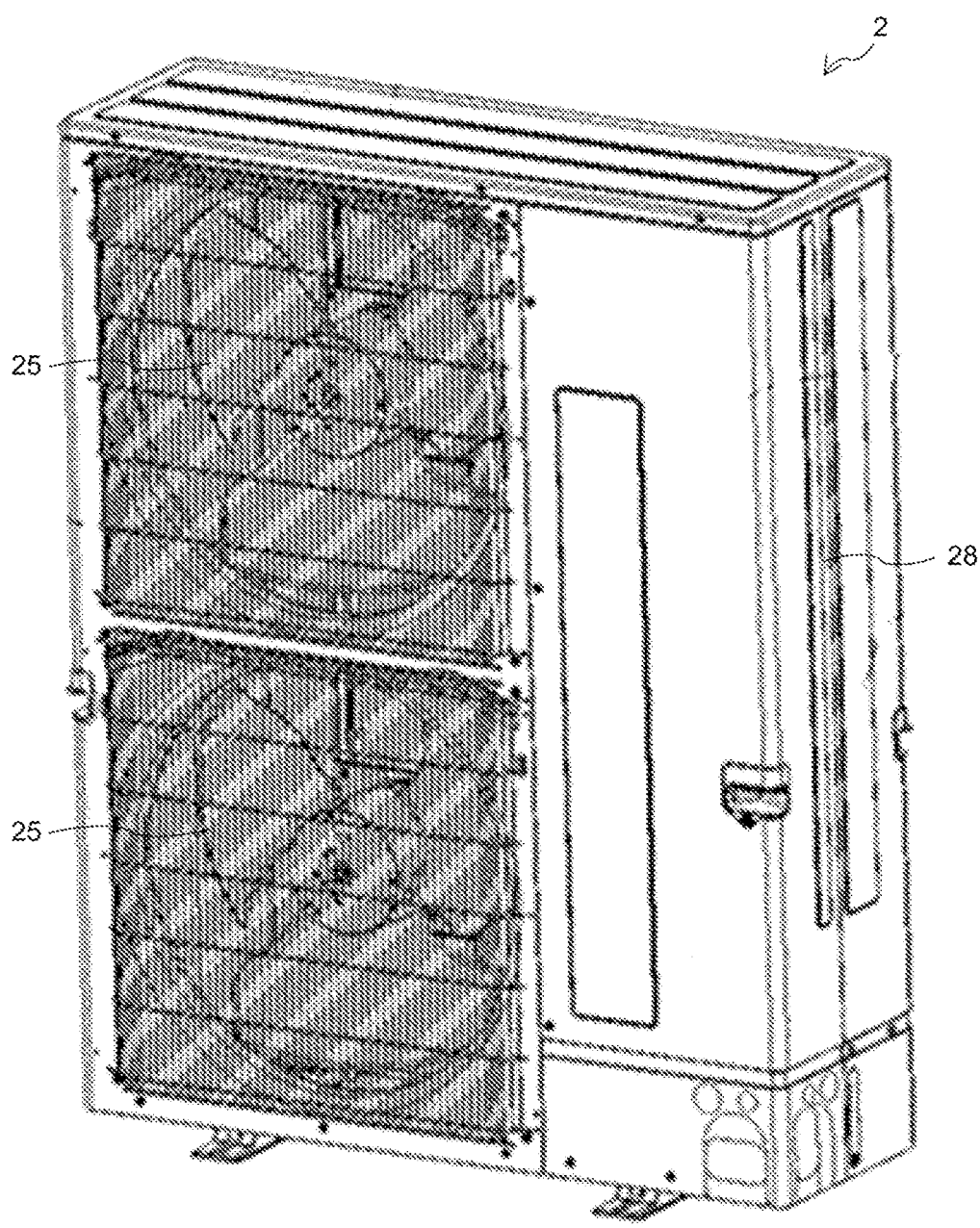
FIG. 2 is a perspective diagram that illustrates an outdoor unit 2 according to Embodiment 1.

FIG. 2 is a perspective diagram that illustrates the outdoor unit 2 according to Embodiment 1. As illustrated in FIG. 1 and FIG. 2, the outdoor unit 2 has a compressor 21, a flow switching device 22, an outdoor heat exchanger 23, motors 24, outdoor fans 25, an outdoor-air-temperature sensor 26, and a pressure sensor 27. The outdoor unit 2 is a side-flow unit, which is vertically long and has an air outlet 28 provided in a side face of the outdoor unit 2. Air is blown out from the side face through the air outlet 28.

Compressor 21

The compressor 21 is configured to suck low-temperature and low-pressure refrigerant, compress the sucked refrigerant into high-temperature and high-pressure refrigerant, and discharge the compressed refrigerant. The compressor 21 is, for example, an inverter compressor, which is driven by a motor (not illustrated) of which frequency is controlled by an inverter (not illustrated). Furthermore, the compressor 21 is connected to an outdoor controller 51, which is described later, included in the controller 5 via a wire 70.

Flow Switching Device 22

The flow switching device 22 is configured to switch flow directions of refrigerant and is, for example, a four-way valve. For cooling operation, the flow switching device 22 connects a discharge port of the compressor 21 and the outdoor heat exchanger 23 to each other and connects a suction port of the compressor 21 and indoor heat exchangers 32 to each other. Furthermore, for heating operation, the flow switching device 22 connects the discharge port of the compressor 21 and the indoor heat exchangers 32 to each other and connects the suction port of the compressor 21 and the outdoor heat exchanger 23 to each other. The flow switching device 22 does not always have to be a four-way valve. Alternatively, the flow switching device 22 may be obtained by combining a plurality of valves, such as two-way valves and three-way valves, such that the obtained flow switching device serves as a four-way valve.

Outdoor Heat Exchanger 23

The outdoor heat exchanger 23 is configured to cause refrigerant that flows in the outdoor heat exchanger 23 and outdoor air to exchange heat with each other. The outdoor heat exchanger 23 is, for example, a fin-and-tube heat exchanger. The outdoor heat exchanger 23 serves as a condenser in the cooling operation and serves as an evaporator in the heating operation. The outdoor heat exchanger 23 has, for example, a width of 800 mm to 1,200 mm and a height of 1,100 mm to 1,800 mm. A quantity of heat exchange Q [kW] in a case in which the outdoor heat exchanger 23 serves as a condenser is expressed by $Q = Ga \times Cp \times \varepsilon \Delta T$, where a mass flow rate of air, a specific heat at a constant pressure of air, a temperature efficiency ratio, and a difference between a condensation temperature and a suction temperature are respectively defined as Ga [kg/s], Cp [kJ/kg·K], $\varepsilon$[−], and $\Delta T$ [K].

Motors 24

The outdoor unit 2 has the plurality of motors 24. A shaft (not illustrated) of each of the motors 24 is configured to rotate and transmit rotational force of the shaft to the corresponding one of the outdoor fans 25. The motors 24 are connected to the outdoor controller 51 via the wire 70 and information of respective rotation frequencies of their shafts is transmitted from the outdoor controller 51. That is, driving of the motors 24 is controlled by the outdoor controller 51.

Outdoor Fans 25

The outdoor unit 2 has the plurality of outdoor fans 25. The outdoor fans 25 are each connected to the corresponding one of the motors 24. The outdoor fans 25 are each a device configured to rotate by driving of the corresponding one of the motors 24 and thus send outdoor air to the outdoor heat exchanger 23. The outer diameter of each of the outdoor fans 25 is, for example, $\varphi$480 mm to $\varphi$600 m. All the outdoor fans 25 operate, air is thus sent to the entirety of the outdoor heat exchanger 23. That is, in a case in which operation of one or more of the outdoor fans 25 is stopped, air hardly passes through part of the outdoor heat exchanger 23 that faces the one or more of the outdoor fans 25 of which operation is stopped. At this time, the heat-transfer area of the outdoor heat exchanger 23 is substantially reduced. Embodiment 1 describes a case in which two outdoor heat exchangers 23 are provided as an example. Alternatively, the number of the outdoor heat exchangers 23 may be three or more.

Outdoor-Air-Temperature Sensor 26 and Pressure Sensor 27

The outdoor-air-temperature sensor 26 is a device configured to detect a temperature of an outdoor space in which the outdoor unit 2 is located. The outdoor-air-temperature sensor 26 is connected to the outdoor controller 51 via the wire 70. The pressure sensor 27 is a device configured to detect a pressure of refrigerant discharged from the compressor 21. The pressure sensor 27 is connected to the outdoor controller 51 via the wire 70.

Indoor Units 3

The two indoor units 3 each have an expansion device 31, the corresponding one of the indoor heat exchangers 32, and an indoor fan 33.

Expansion Devices 31

The expansion devices 31 are each configured to expand and decompress refrigerant. The expansion devices 31 are each connected to the corresponding one of indoor controllers 52, which are described later, included in the controller 5 via the wire 70. The expansion devices 31 are each, for example, an electronic expansion valve of which opening degree is controlled by the corresponding one of the indoor controllers 52.

Indoor Heat Exchangers 32

The indoor heat exchangers 32 are each configured to cause indoor air and refrigerant to exchange heat with each other. The indoor heat exchangers 32 serve as evaporators in the cooling operation and serve as condensers in the heating operation.

Indoor Fans 33

The indoor fans 33 are each a device configured to send indoor air to the corresponding one of the indoor heat exchangers 32. The indoor fans 33 are each, for example, a cross-flow fan. The indoor fans 33 are each connected to the corresponding one of the indoor controllers 52 via the wire 70. The rotation frequency of each of the indoor fans 33 is controlled by the corresponding one of the indoor controllers 52.

Refrigerant Pipe 4

The refrigerant pipe 4 connects the compressor 21, the flow switching device 22, the outdoor heat exchanger 23, the expansion devices 31, and the indoor heat exchangers 32 to each other, causes refrigerant to flow in the refrigerant pipe 4, and thus forms a refrigerant circuit 6. The refrigerant pipe 4 includes a liquid extension pipe 41 and a gas extension pipe 42. The liquid extension pipe 41 is a pipe that connects the outdoor unit 2 and each of the indoor units 3 to each other and causes liquid refrigerant to flow in the pipe. A liquid-pipe valve 43 is located in the liquid extension pipe 41 and between the outdoor unit 2 and the indoor units 3. The liquid-pipe valve 43 is a valve located in the outdoor unit 2 and configured to adjust a flow rate of refrigerant. The gas extension pipe 42 is a pipe that connects the outdoor unit 2 and each of the indoor units 3 to each other and causes gas refrigerant to flow in the pipe. A gas-pipe valve 44 is located in the gas extension pipe 42 and between the outdoor unit 2 and the indoor units 3. The gas-pipe valve 44 is a valve located in the outdoor unit 2 and configured to adjust a flow rate of refrigerant.

Operation of the air-conditioning apparatus 1 is described below. First, cooling operation is described. Refrigerant is sucked into the compressor 21, compressed by the compressor 21, and discharged as high-temperature and high-pressure refrigerant. The discharged refrigerant passes through the flow switching device 22 and flows into the outdoor heat exchanger 23. The refrigerant having flowed into the outdoor heat exchanger 23 exchanges heat with outdoor air, which serves as heat medium, and is condensed. The condensed refrigerant flows into the expansion device 31 in each of the indoor units 3 and is expanded and decompressed by the expansion device 31. The decompressed refrigerant flows into the outdoor heat exchanger 23. The refrigerant having flowed into the indoor heat exchangers 32 exchanges heat with indoor air and is evaporated. At this time, the indoor air is cooled and thus the indoor space is cooled. Subsequently, the evaporated refrigerant passes through the flow switching device 22 and is sucked into the compressor 21.

Next, heating operation is described below. Refrigerant is sucked into the compressor 21, compressed by the compressor 21, and discharged as high-temperature and high-pressure refrigerant. The discharged refrigerant passes through the flow switching device 22 and flows into the indoor heat exchanger 32 in each of the indoor units 3. The refrigerant having flowed into the indoor heat exchangers 32 exchanges heat with indoor air and is condensed. At this time, the indoor air is heated and thus the indoor space is heated. The condensed refrigerant flows into the expansion devices 31 and is expanded and decompressed by the expansion devices 31. The decompressed refrigerant flows into the outdoor heat exchanger 23. The refrigerant having flowed into the outdoor heat exchanger 23 exchanges heat with outdoor air, which serves as heat medium, and is evaporated. Subsequently, the evaporated refrigerant passes through the flow switching device 22 and is sucked into the compressor 21.

Controller 5

The controller 5 is configured to control operation of each device included in the air-conditioning apparatus 1. The controller 5 is formed by the outdoor controller 51 and the indoor controllers 52. The outdoor controller 51 is stored in the outdoor unit 2 and configured to control operation of each device connected to the outdoor controller 51. The indoor controllers 52 are each stored in the corresponding one of the indoor units 3 and configured to control operation of each device connected to the indoor controller 52. The outdoor controller 51 and the indoor controllers 52 are connected to each other via the wire 70. The controller 5 may have only one controller among the outdoor controller 51 and the indoor controllers 52 and the only one controller may be configured to control devices in the entirety of the air-conditioning apparatus 1. Furthermore, the controller 5 may be stored in a unit, such as a housing and a casing, that is not any of the outdoor unit 2 and the indoor units 3.

The controller 5 is a dedicated hardware device or a central processing unit (also referred to as a CPU, a central processor, a processing unit, an arithmetic unit, a microprocessor, a microcomputer, or a processor) that executes a program stored in a memory (not illustrated). In a case in which the controller 5 is a dedicated hardware device, a single circuit, a composite circuit, an application specific integrated circuit (ASIC), a field-programmable gate array (FPGA) or a combination of these circuits corresponds to the controller 5. Functional units implemented by the controller 5 may be implemented by respective hardware devices or may be implemented by one hardware device.

In a case in which the controller 5 is a CPU, functions executed by the controller 5 may be implemented by software, firmware, or a combination of software and firmware. Software or firmware is described as a program and stored in the memory. The CPU reads out and executes the program stored in the memory to implement the functions. The memory here is, for example, a nonvolatile or volatile semiconductor memory, such as a random-access memory (RAM), a read-only memory (ROM), a flash memory, an erasable programmable read-only memory (EPROM), and an electrically erasable programmable read-only memory (EEPROM). Some of the functions implemented by the controller 5 may be implemented by a dedicated hardware device and some of the functions may be implemented by software or firmware.

Figure 3:
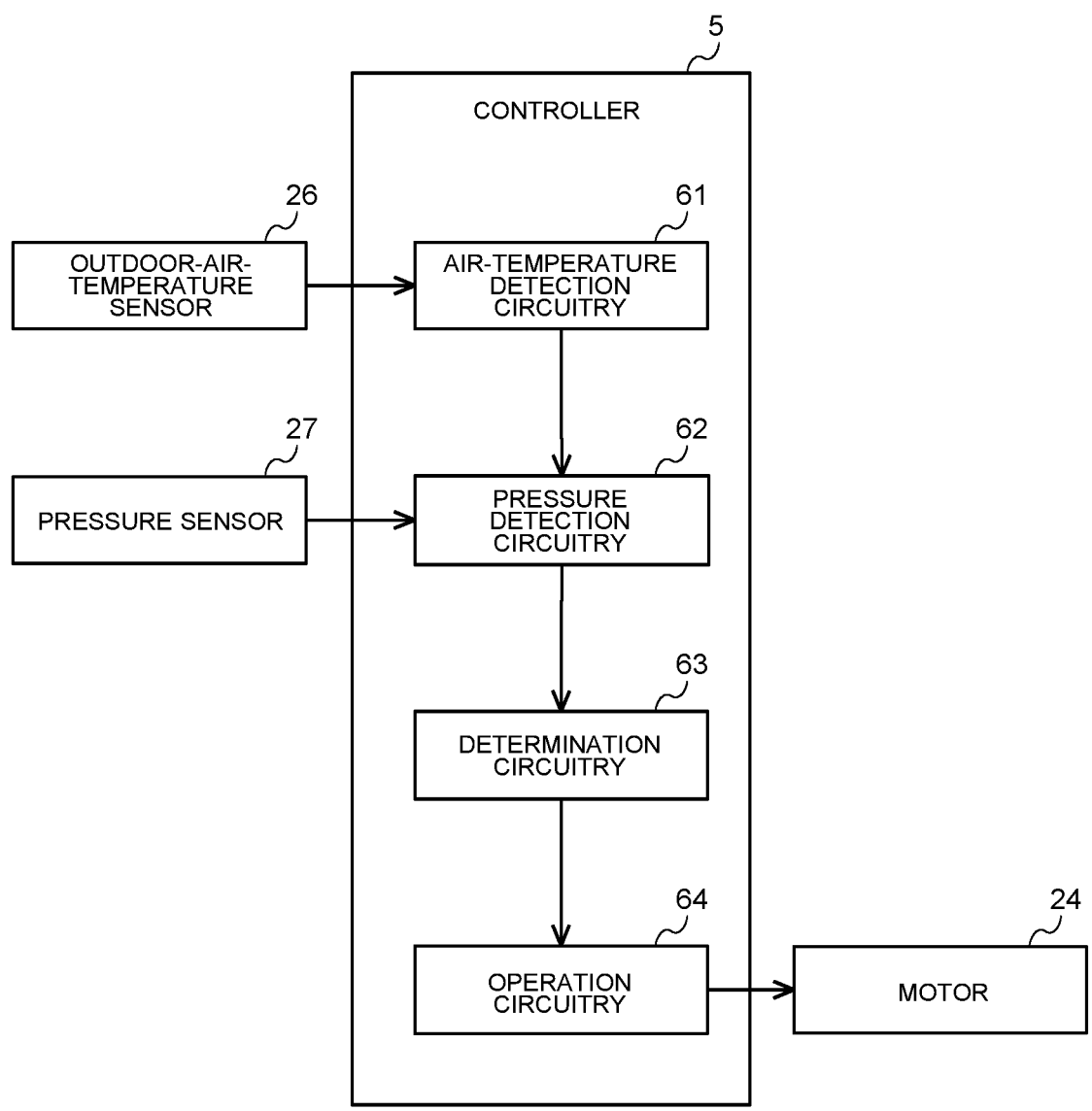
FIG. 3 is a functional block diagram that illustrates a controller 5 according to Embodiment 1.

FIG. 3 is a functional block diagram that illustrates the controller 5 according to Embodiment 1. As illustrated in FIG. 3, the controller 5 has air-temperature detection circuitry 61, pressure detection circuitry 62, determination circuitry 63, and operation circuitry 64. The air-temperature detection circuitry 61, the pressure detection circuitry 62, the determination circuitry 63, and the operation circuitry 64 are formed by algorithms.

Air-Temperature Detection Circuitry 61 and Pressure Detection Circuitry 62

The air-temperature detection circuitry 61 is configured to detect an air temperature by use of the outdoor-air-temperature sensor 26. The pressure detection circuitry 62 is configured to detect a pressure of refrigerant by use of the pressure sensor 27.

Determination Circuitry 63

The determination circuitry 63 is configured to determine whether a pressure of refrigerant detected by the pressure detection circuitry 62 is a value within a target range Pdm±α at predetermined time intervals in cooling operation. The target range Pdm±α is a value obtained by adding and subtracting a stability value a to and from a target pressure value pdm, which is a target value to be reached to control a pressure of refrigerant. The stability value a is a value that represents a range from an upper limit to a lower limit in which a pressure of refrigerant is determined to be roughly stable in the vicinity of the target pressure value pdm.

Operation Circuitry 64

FIG. 4 is a table that illustrates operation levels and rotation frequencies of the outdoor fans 25 according to Embodiment 1. The operation circuitry 64 is configured to control the number of the outdoor fans 25 in operation and the rotation frequency of the outdoor fans 25 by setting operation levels shown in a left column illustrated in FIG. 4 such that the number and the rotation frequencies in right columns correspond to the set operation level. Operation levels in lower rows are represented by numbers greater than numbers that represent operation levels in upper rows. The heat-exchange capability of the outdoor heat exchanger 23 is higher in operation levels in lower rows than that in a case of operation levels in higher rows. In description below, the higher the heat-exchange capability of the outdoor heat exchanger 23, the higher operation level the operation level is expressed as. That is, an operation level N in the lowest row is an operation level at which the heat-exchange capability of the outdoor heat exchanger 23 is the highest.

An operation level a represents an operation level at which the rotation frequency of each of the outdoor fans 25 in operation is maximum possible in a case in which the number of the outdoor fans 25 in operation is n−1. The number n is any number that is lower than or equal to the number of all the outdoor fans 25 included in the outdoor unit 2. An operation level b represents an operation level at which the rotation frequency of each of the outdoor fans 25 in operation is minimum possible in a case in which the number of the outdoor fans 25 in operation is n. A rotation frequency at the operation level b is the lowest possible among rotation frequencies that are applicable to the outdoor unit 2. The rotation frequency at the operation level b is calculated on the basis of the specifications of the motors 24, measurement results of a noise, and other factors. The rotation frequency of each of the outdoor fans 25 in operation at the operation level a is higher than the rotation frequency of each of the outdoor fans 25 in operation at the operation level b. Usually, the higher a rotation frequency of each of the outdoor fans 25, the larger an amount of air that passes through each of the outdoor fans 25. The amount of air that passes through each of the outdoor fans 25 in operation at the operation level a is thus larger than the amount of air that passes through each of the outdoor fans 25 in operation at the operation level b.

Heat-exchange capability Qa at the operation level a is expressed by $Qa=E \times Xa \times Ya$, where the constant, the amount of air, and the heat-transfer area are respectively defined as E, Xa, and Ya. In addition, heat-exchange capability Qb at the operation level b is expressed by $Qb=E \times Xb \times Yb$, where the constant, the amount of air, and the heat-transfer area are respectively defined as E, Xb, and Yb. In a case in which the heat-transfer area Ya at the operation level a is defined as 1, the heat-transfer area Yb at the operation level b is expressed as $(N-1)/N$ because the number of the outdoor fans 25 in operation at the operation level a is smaller by one than the number of the outdoor fans 25 in operation at the operation level b. That is, the heat-exchange capability Qb at the operation level b is expressed by $Qb=E \times Xb \times (N-1)/N$. Furthermore, as described above, the amount of air that passes through each of the outdoor fans 25 in operation at the operation level a is larger than the amount of air that passes through each of the outdoor fans 25 in operation at the operation level b, and the heat-exchange capability Qa and the heat-exchange capability Qb thus approximate each other.

The operation circuitry 64 is configured to set the operation level to a primary operation level, which is predetermined on the basis of an air temperature detected by the air-temperature detection circuitry 61, the number of all the outdoor fans 25 included in the outdoor unit 2, and other factors. In a case in which a pressure Pd is determined by the determination circuitry 63 to be higher than Pdm+α, the operation circuitry 64 transits the operation level to the higher operation level. That is, the heat-exchange capability of the outdoor heat exchanger 23 improves. In this case, when operation of one of the outdoor fans 25 is started, a rotation frequency of each of the outdoor fans 25 after operation of the one of the outdoor fans 25 is started is lower than a rotation frequency of each of the outdoor fans 25 before operation of the one of the outdoor fans 25 is started.

In addition, in a case in which the pressure Pd is determined by the determination circuitry 63 to be lower than Pdm−α, the operation circuitry 64 transits the operation level to the lower operation level. That is, the heat-exchange capability of the outdoor heat exchanger 23 decreases. In this case, when operation of one of the outdoor fans 25 is stopped, a rotation frequency of each of the outdoor fans 25 after operation of the one of the outdoor fans 25 is stopped is higher than a rotation frequency of each of the outdoor fans 25 before operation of the one of the outdoor fans 25 is stopped. Furthermore, in a case in which the pressure Pd is determined by the determination circuitry 63 to be a value within Pdm±α, the operation circuitry 64 maintains the current operation level.

Figure 5:
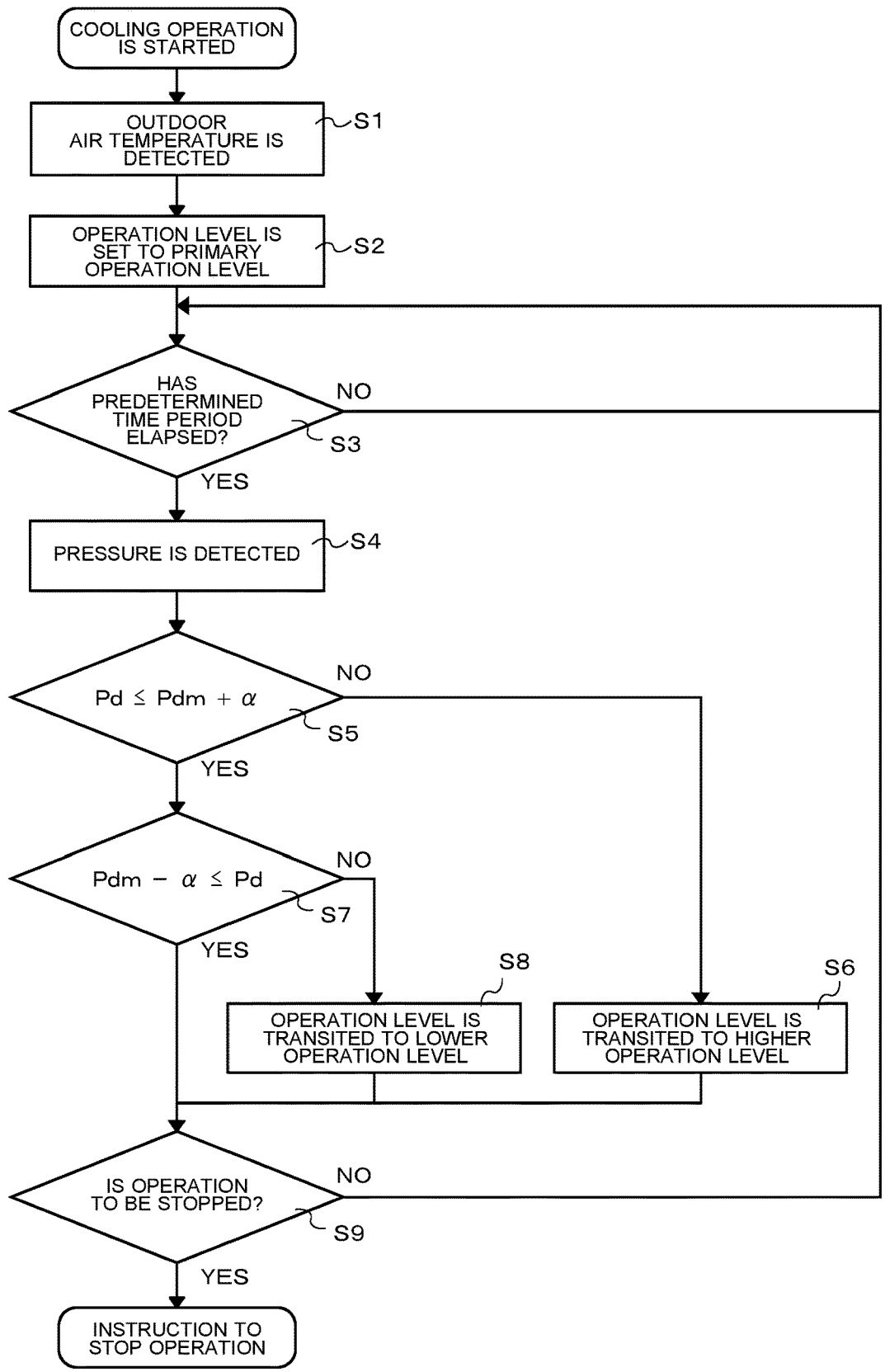
FIG. 5 is a flowchart that illustrates operation of the controller 5 according to Embodiment 1.

FIG. 5 is a flowchart that illustrates operation of the controller 5 according to Embodiment 1. With reference to FIG. 5, a procedure is described below in which the controller 5 controls the outdoor fans 25 in cooling operation. First, the air-conditioning apparatus 1 starts cooling operation and then the air-temperature detection circuitry 61 detects a temperature of outdoor air (step S1). Next, the operation circuitry 64 sets the operation level to the primary operation level (step S2). Here, the controller 5 determines whether the predetermined time has elapsed (step S3). In a case in which the predetermined time has not elapsed (NO in step S3), the controller 5 repeatedly determines whether the predetermined time has elapsed (step S3). In a case in which the predetermined time has elapsed (YES in step S3), the pressure detection circuitry 62 detects a pressure of refrigerant (step S4).

The determination circuitry 63 determines whether the detected pressure Pd is lower than or equal to Pdm+α (step S5). In a case in which the pressure Pd is determined by the determination circuitry 63 to be higher than Pdm+α (NO in step S5), the operation circuitry 64 transits the operation level to the higher operation level (step S6). In a case in which the pressure Pd is determined by the determination circuitry 63 to be lower than or equal to Pdm+α (YES in step S5), the determination circuitry 63 determines whether the detected pressure Pd is higher than or equal to Pdm−α (step S7). In a case in which the pressure Pd is determined by the determination circuitry 63 to be lower than Pdm−α (NO in step S7), the operation circuitry 64 transits the operation level to the lower operation level (step S8). In a case in which the pressure Pd is determined by the determination circuitry 63 to be higher than or equal to Pdm−α (YES in step S7), the operation circuitry 64 maintains the current operation level.

Finally, the controller 5 determines whether the operation of the air-conditioning apparatus 1 is stopped (step S9). In a case in which the operation of the air-conditioning apparatus 1 is not stopped (NO in step S9), the controller 5 determines whether the predetermined time has elapsed (step S3). In a case in which the operation of the air-conditioning apparatus 1 is stopped (YES in step S9), the operation circuitry 64 stops driving of the outdoor fans 25 and other devices.

According to Embodiment 1, when operation of one of the outdoor fans is stopped, the controller 5 controls the motors 24 such that a rotation frequency of each of the outdoor fans 25 that is in operation after operation of the one of the outdoor fans 25 is stopped is higher than a rotation frequency of each of the outdoor fans 25 that is in operation before operation of the one of the outdoor fans 25 is stopped. When operation of one of the outdoor fans 25 is stopped, the heat-exchange capability of the outdoor heat exchanger 23 is thus gradually reduced. The outdoor unit 2 is therefore capable of retaining a stable refrigeration cycle.

In addition, in cooling operation performed when outdoor air is low in temperature and a load is low, the outdoor unit 2 does not have to use an outdoor heat exchanger 23 that is downsized to reduce the heat-exchange capability. Furthermore, the outdoor unit 2 is not designed such that the number of the outdoor fans 25 is reduced. As described above, the outdoor unit 2 is provided with the outdoor heat exchanger 23 and the outdoor fans 25 on the basis of normal operation that is different from cooling operation performed when outdoor air is low in temperature and a load is low. The outdoor unit 2 therefore does not have to reduce its maximum possible cooling capacity and heating capacity to be adapted to a time when outdoor air is low in temperature and a load is low.

In addition, according to Embodiment 1, when operation of one of the outdoor fans is started, the controller 5 controls the motors 24 such that a rotation frequency of each of the outdoor fans 25 that is in operation after operation of the one of the outdoor fans 25 is started is lower than a rotation frequency of each of the outdoor fans 25 that is in operation before operation of the one of the outdoor fans 25 is started. When operation of one of the outdoor fans 25 is started, the heat-exchange capability of the outdoor heat exchanger 23 is thus gradually increased. The outdoor unit 2 is therefore capable of retaining a stable refrigeration cycle.

The invention claimed is:

1. An outdoor unit of an air-conditioning apparatus, the outdoor unit comprising:
an outdoor heat exchanger configured to cause refrigerant that flows in the outdoor heat exchanger and air to exchange heat with each other;
a plurality of outdoor fans each configured to rotate by driving of a motor and send air to the outdoor heat exchanger;
a controller configured to control the driving of the motor of each of the plurality of outdoor fans; and
a pressure sensor configured to detect a pressure of the refrigerant,
the controller is further configured to
determine whether the pressure of the refrigerant detected by the pressure sensor is lower than a lower limit value of a target range for refrigerant pressure stability, and determine whether operation of one of the plurality of outdoor fans is stopped,
responsive to determining that the pressure of the refrigerant detected by the pressure sensor is lower than the lower limit value of the target range and that operation of one of the plurality of outdoor fans is stopped, control the motor of each of the plurality of outdoor fans such that a rotation frequency of each of the plurality of outdoor fans that is in operation after operation of the one of the plurality of outdoor fans is stopped is at a respective predetermined rotation frequency which is higher than a rotation frequency of each of the plurality of outdoor fans that is in operation before operation of the one of the plurality of outdoor fans is stopped.

2. The outdoor unit of an air-conditioning apparatus of claim 1, wherein the respective predetermined rotation frequency is further predefined for each of a plurality of operation levels, wherein the respective predetermined rotation frequency is raised by transiting from a current operation level to a lower operation level of the plurality of operation levels.

3. The outdoor unit of an air-conditioning apparatus of claim 1, wherein the controller is further configured to
determine whether the pressure of the refrigerant detected by the pressure sensor is higher than a higher limit value of the target range, and determine whether operation of one of the plurality of outdoor fans is started,
responsive to determining that the pressure of the refrigerant detected by the pressure sensor is higher than the higher limit value of the target range and that operation of one of the plurality of outdoor fans is started, control the motor of each of the plurality of outdoor fans such that a rotation frequency of each of the plurality of outdoor fans that is in operation after operation of the one of the plurality of outdoor fans is started is at a respective predetermined rotation frequency which is lower than a rotation frequency of each of the plurality of outdoor fans that is in operation before operation of the one of the plurality of outdoor fans is started.

4. The outdoor unit of an air-conditioning apparatus of claim 3, wherein the respective predetermined rotation frequency is further predefined for each of a plurality of operation levels, wherein the respective predetermined rotation frequency is lowered by transiting from a current operation level to a higher operation level of the plurality of operation levels.

* * * * *